(12) United States Patent
Gupta et al.

(10) Patent No.: US 11,695,850 B2
(45) Date of Patent: Jul. 4, 2023

(54) METHOD AND EDGE ENABLER SERVER FOR PROVIDING DYNAMIC INFORMATION TO EDGE ENABLER CLIENT RUNNING IN UE

(71) Applicant: Samsung Electronics Co., Ltd., Suwon-si (KR)

(72) Inventors: Nishant Gupta, Bangalore (IN); Lalith Kumar, Bangalore (IN); Suresh Chitturi, Bangalore (IN); Basavaraj Jayawant Pattan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 17/609,605

(22) PCT Filed: May 8, 2020

(86) PCT No.: PCT/KR2020/006132
§ 371 (c)(1),
(2) Date: Nov. 8, 2021

(87) PCT Pub. No.: WO2020/231116
PCT Pub. Date: Nov. 19, 2020

(65) Prior Publication Data
US 2022/0201093 A1 Jun. 23, 2022

(30) Foreign Application Priority Data

May 10, 2019 (IN) .............................. 201941018850
May 4, 2020 (IN) .............................. 2019 41018850

(51) Int. Cl.
*H04L 29/08* (2006.01)
*H04L 67/567* (2022.01)
(Continued)

(52) U.S. Cl.
CPC ............ *H04L 67/567* (2022.05); *H04L 67/60* (2022.05); *H04W 8/20* (2013.01)

(58) Field of Classification Search
CPC ................................. H04L 29/08; H04W 8/24
(Continued)

(56) References Cited

U.S. PATENT DOCUMENTS

| 2002/0188720 | A1 | 12/2002 | Terrell et al. |
| 2014/0143428 | A1 | 5/2014 | Zheng |
| 2018/0218034 | A1 | 8/2018 | Sainaney |
| 2018/0310150 | A1 | 10/2018 | Cuevas Ramirez et al. |

(Continued)

FOREIGN PATENT DOCUMENTS

WO 2018/141046 A1 8/2018

OTHER PUBLICATIONS

3GPP; 3rd Generation Partnership Project; Technical Specification Group Services and System Aspects; Study on application architecture for enabling Edge Applications; (Release 17); 3GPP TR 23.758 V0.1.0; Apr. 2019; Valbonne, FR.

(Continued)

*Primary Examiner* — Jude Jean Gilles
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). Embodiments herein disclose a method for providing dynamic information to an edge enabler client (140) running in a UE (100). The method includes receiving, by an edge enabler server (300), a subscription request for a dynamic information subscription from the edge enabler client (140). Further, (Continued)

the method includes creating, by the edge enabler server (300), the dynamic information subscription to provide the dynamic information to the edge enabler client (140) based on the dynamic information provided in the subscription request. Further, the method includes sending, by the edge enabler server (300), a subscription response to the edge enabler client running in the UE (100) in response to creating the dynamic information subscription.

16 Claims, 5 Drawing Sheets

(51) Int. Cl.
    *H04L 67/60*     (2022.01)
    *H04W 8/20*     (2009.01)
    *H04W 8/28*     (2009.01)

(58) Field of Classification Search
    USPC .................................................... 709/201
    See application file for complete search history.

(56) References Cited

U.S. PATENT DOCUMENTS

2018/0367314 A1    12/2018   Egner et al.
2020/0359218 A1*   11/2020   Lee ...................... H04M 15/55

OTHER PUBLICATIONS

3GPP; 3rd Generation Partnership Project; Technical Specification Group Services and System Aspects; Study on application architecture for enabling Edge Applications; (Release 17); 3GPP TR 23.758; V17.0.0; XP051840754; Dec. 19, 2019; Valbonne, France.
ETSI; Group Specification; Multi-access Edge Computing (MEC); MEC Platform Application Enablement; Draft ETSI GS MEC 011; V2.0.8; XP014341095; Apr. 23, 2019; Sophia Antipolis Cedex, France.
3GPP; 3rd Generation Partnership Project; Technical Specification Group Services and System Aspects; Architecture for enabling Edge Applications; (Release 17); 3GPP TS 23.558; V0.2.0; XP051876624; Apr. 17, 2020; Valbonne, France.
European Search Report dated Apr. 12, 2022; European Appln. No. 20805516.0-1218 / 3954104 PCT/KR2020006132.

* cited by examiner

[Fig. 1A]
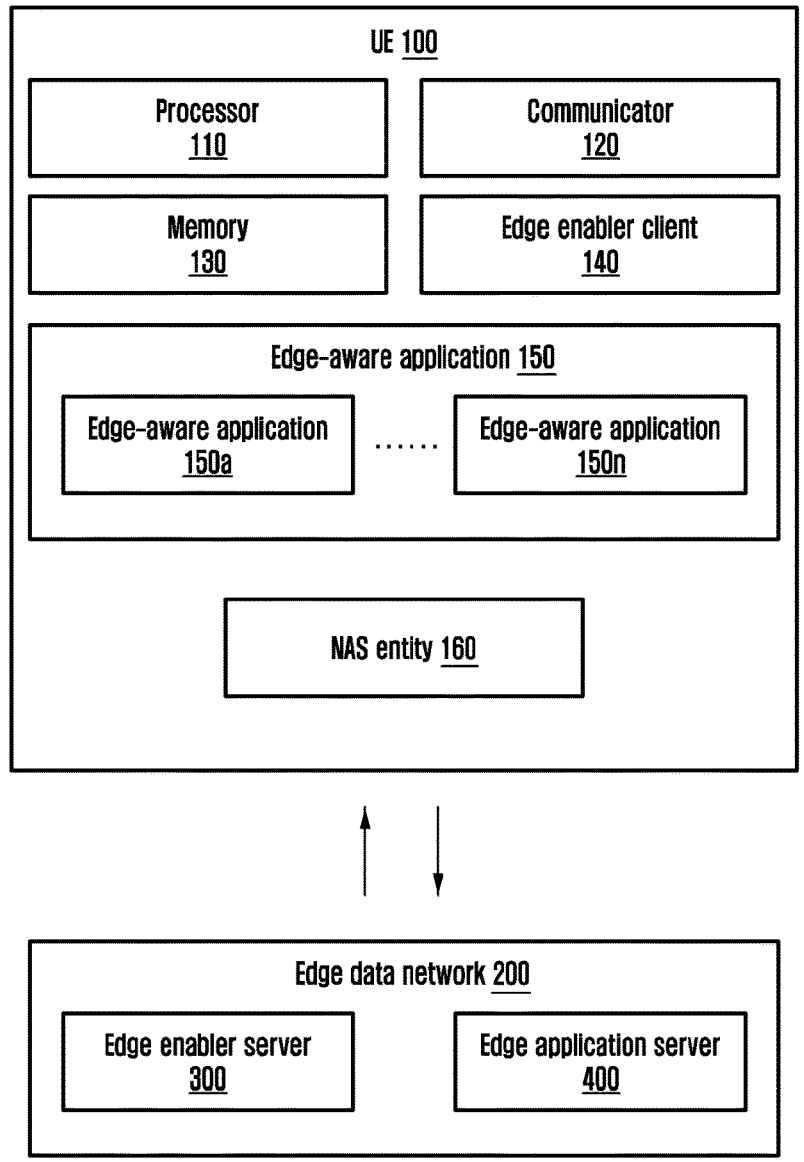
[Fig. 1B]
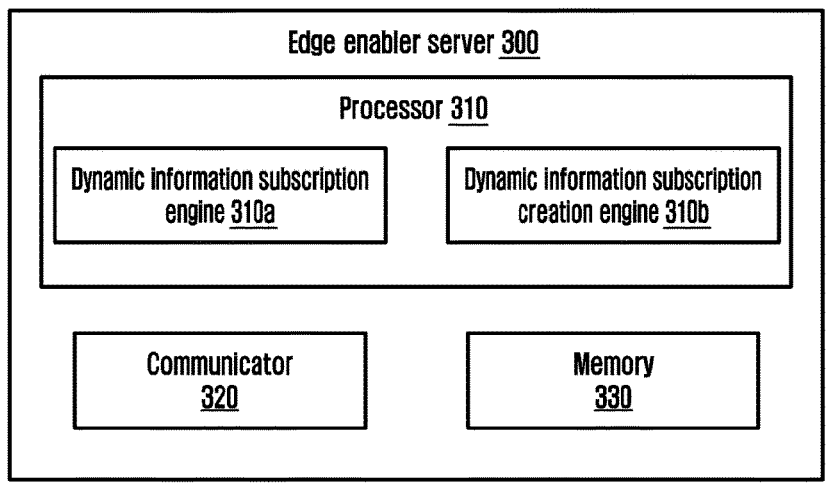

[Fig. 2]
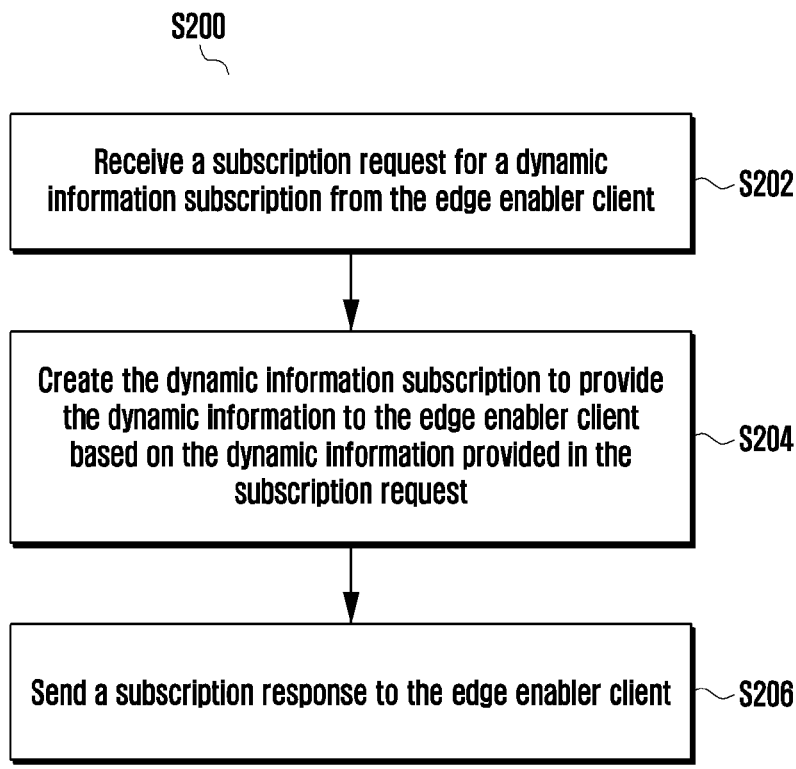
[Fig. 3]
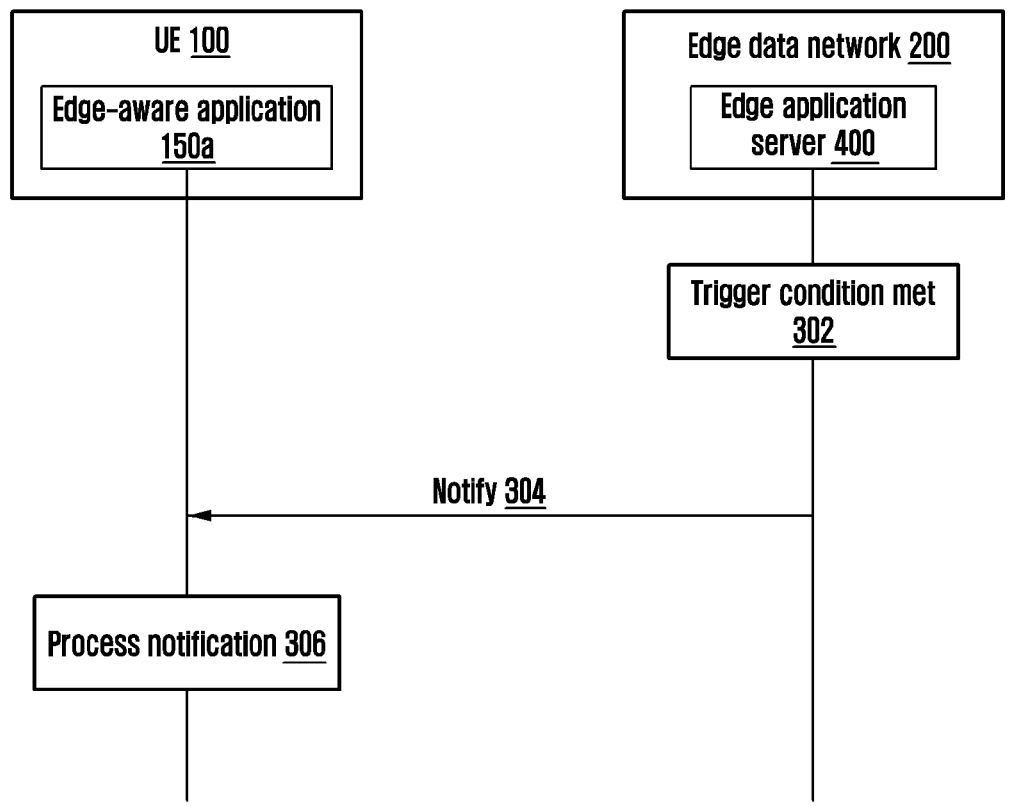

[Fig. 4]
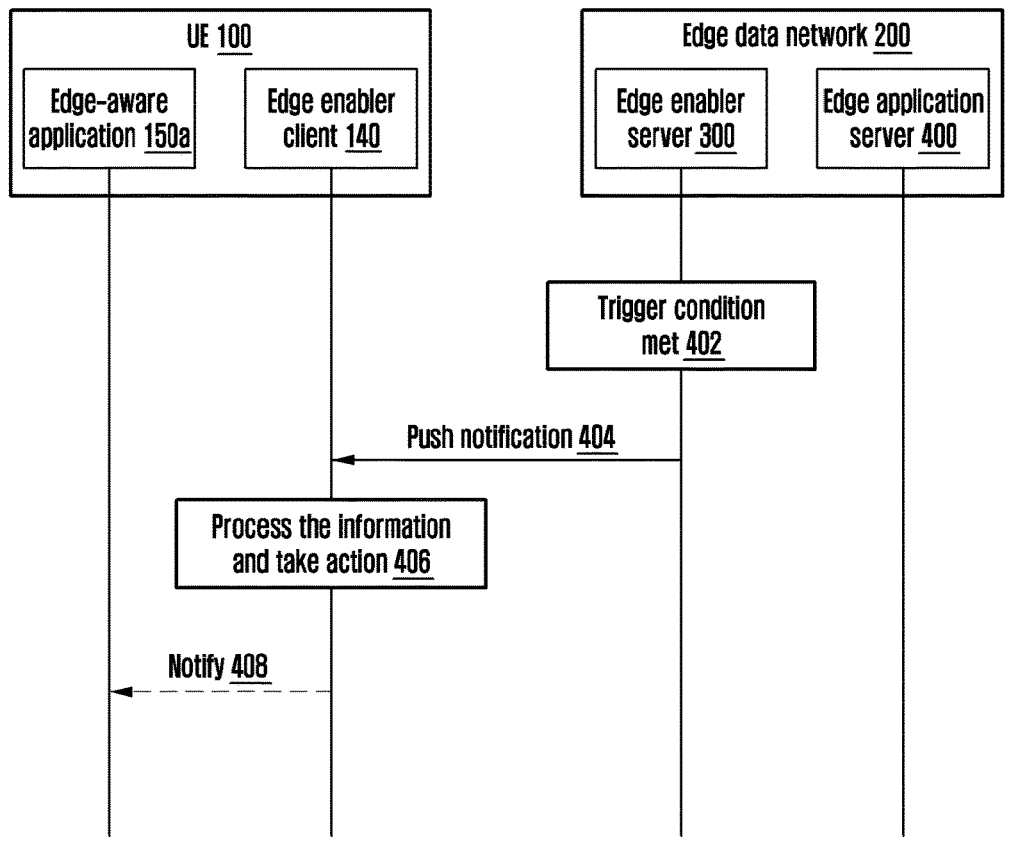
[Fig. 5]
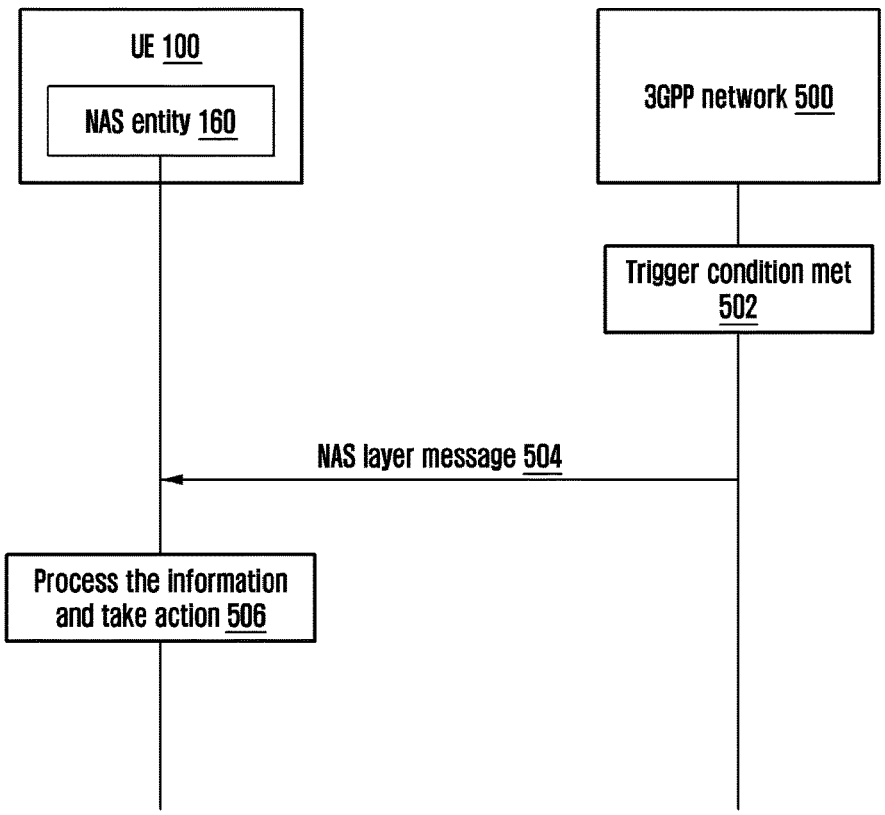

[Fig. 6A]
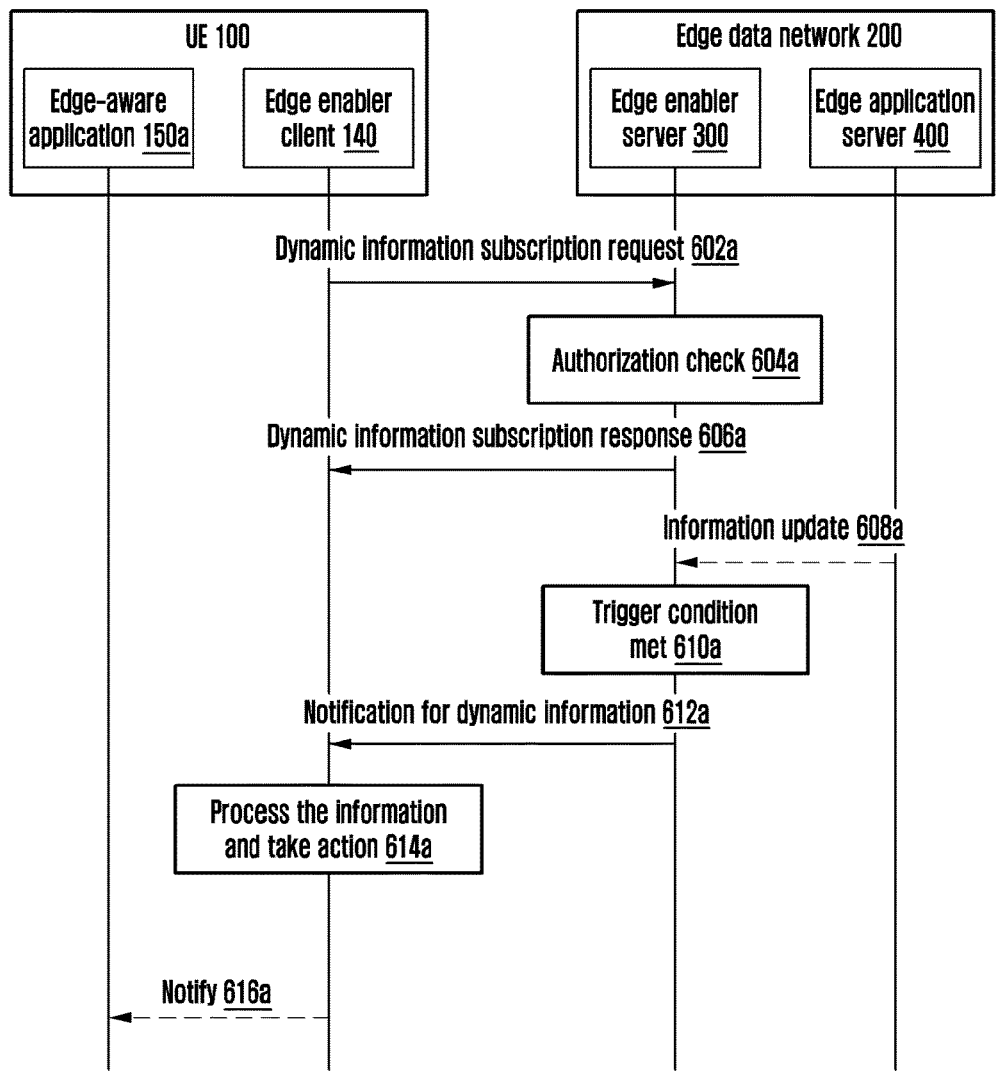
[Fig. 6B]
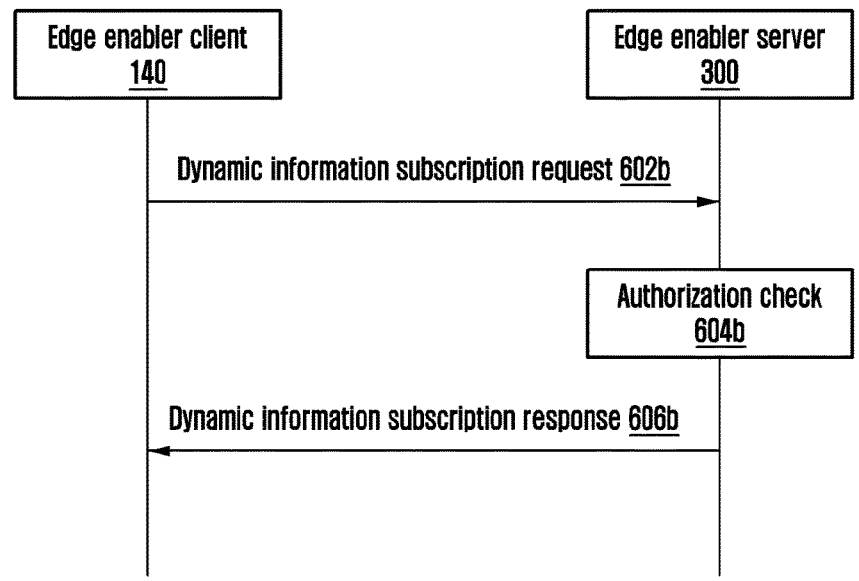

[Fig. 6C]
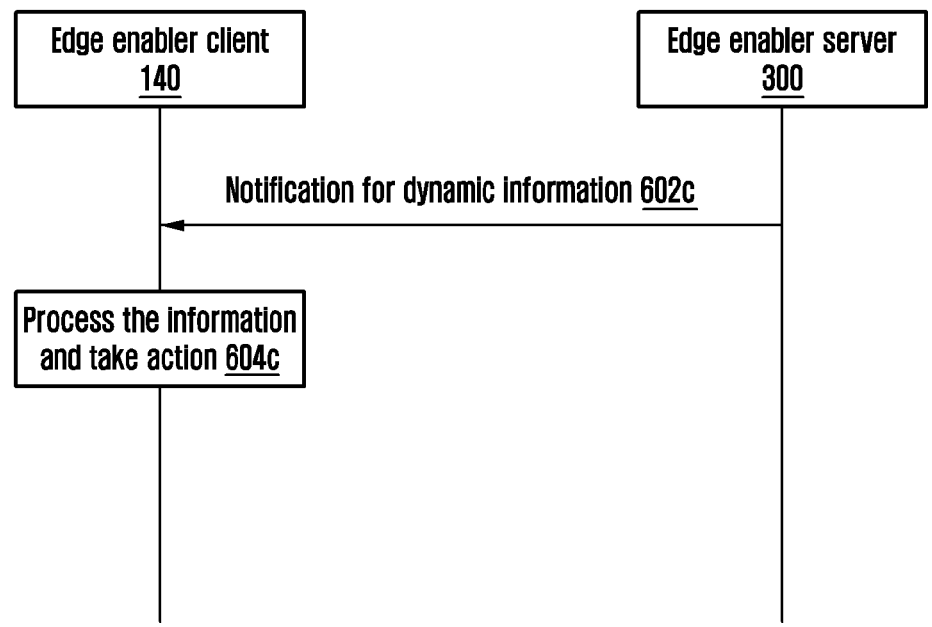

METHOD AND EDGE ENABLER SERVER FOR PROVIDING DYNAMIC INFORMATION TO EDGE ENABLER CLIENT RUNNING IN UE

TECHNICAL FIELD

The present disclosure relates to edge computing, and more specifically related to a method and edge enabler server for providing dynamic information to an edge enabler client running in a User Equipment (UE). The present application is based on, and claims priority from an Indian Application Number 201941018850 filed on 10th May, 2019 the disclosure of which is hereby incorporated by reference herein.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

With the advent of edge computing capabilities, applications can be more responsive and provide features which were not possible without the low latency and fast processing capabilities provided by edge computing systems. The applications like VR gaming and network assisted processing will heavily rely on the edge computing capabilities. Certain features of the applications may still be provided without the use of the edge computing systems, while certain features will not be serviceable without edge computing.

The edge computing systems provided by a service provider, such as Mobile Network Operator, may not be ubiquitous in near future due to operational and financial constraints. The application, to leverage the edge computing capabilities and features provided by the edge computing system, needs to be aware of the edge computing systems at disposal, such as, to enable or disable features which rely on use of the edge computing systems.

Also, availability of such edge computing systems can change dynamically due to multiple reasons. Such changes should be notified to the applications to fine tune the provided services accordingly. For instance, the availability of the edge applications may be dependent on the location of the user, and the content that is available at the edge. Further, the mechanisms of notifications for sharing dynamic availability information, can be used for targeted advertising such as invitations to use the edge computing enabled features of the applications.

DISCLOSURE OF INVENTION

Technical Problem

Therefore, there is a need for methods and a system to provide applications with the knowledge about Edge computing systems, such as its availability, access constraints, the applications provided by the system, and so on. Thus, it is desired to provide a useful alternative.

The principal object of the embodiments herein is to provide a method for providing dynamic information to an edge enabler client running in a UE.

Solution to Problem

Accordingly the embodiments herein provides a method for providing dynamic information to an edge enabler client running in a UE. The method includes receiving, by an edge enabler server, a subscription request for a dynamic information subscription from the edge enabler client running in the UE. The subscription request comprises a criteria for the dynamic information subscription. Further, the method includes authorizing, by an edge enabler server, the subscription request received from the edge enabler client. Further, the method includes creating, by the edge enabler server, the dynamic information subscription to provide the dynamic information to the edge enabler client in response to authorizing the subscription request. Further, the method includes sending, by the edge enabler server, a subscription response to the edge enabler client in response to creating the dynamic information subscription.

In an embodiment, the subscription request from the edge enabler client to the edge enabler server is triggered in response to a request received by the edge enabler client from at least one edge-aware application.

In an embodiment, the criteria for the dynamic information subscription comprises at least one of a level of the dynamic information to be received by the at least one edge-aware application during the dynamic information subscription, a trigger condition to trigger at least one notification of the dynamic information by the edge enabler server to the at least one edge enabler client during the dynamic information subscription, and a criteria to filter the dynamic information to be received by the at least one edge-aware application during the dynamic information subscription.

In an embodiment, authorizing, by the edge enabler server, the dynamic information subscription request received from the edge enabler client comprises determining, by the edge enabler server, that the edge enabler client is authorized to subscribe for at least one of a level of the dynamic information, a trigger condition and a criteria to filter the dynamic information, and creating, by the edge enabler server, the dynamic information subscription in response to the determination.

In an embodiment, the method further includes detecting, by the edge enabler server, a change in level of dynamic information matching to a criteria to filter the dynamic information. Further, the method includes determining, by the edge enabler server, that a trigger condition is met in response to detecting the change in the dynamic information. Further, the method includes sending, by the edge enabler server, a notification comprising the change in the dynamic information to the edge enabler client based on the dynamic information subscription.

In an embodiment, the method further includes receiving, by the edge enabler client, the subscription notification comprising the change in the dynamic information. Further, the method includes processing, by the edge enabler client, the received subscription notification of the dynamic information. Further, the method includes notifying, by the edge enabler client, the change in dynamic information to at least one of the edge-aware application on the UE. Further, the method includes performing, by the edge enabler client, at least one action based on the received notification.

In an embodiment, the processing comprises rerouting a traffic corresponding to the at least one edge-aware application and changing a quality of service (QoS) requirement corresponding to the at least one edge-aware application.

In an embodiment, the at least one action comprises altering a feature set corresponding to the at least one edge-aware application, requesting compute resources corresponding to the at least one edge-aware application, and changing an interface of the at least one edge-aware application.

Accordingly the embodiments herein provides an edge enabler server for providing dynamic information to an edge enabler client running in a UE. The edge enabler server includes a processor coupled with a memory. The processor is configured to receive a subscription request for a dynamic information subscription from the edge enabler client running in the UE. The subscription request comprises a criteria for the dynamic information subscription. Further, the processor is configured to authorize the subscription request received from the edge enabler client. Further, the processor is configured to create the dynamic information subscription to provide the dynamic information to the edge enabler client in response to authorizing the subscription request. Further, the processor is configured to send a subscription response to the edge enabler client in response to creating the dynamic information subscription.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

According to the present disclosure, it is possible to provide information such as availability and access constraints of an edge computing system to an edge enabler client running in a UE. Accordingly, the UE can dynamically respond to availability and access constraints of the edge computing system.

BRIEF DESCRIPTION OF DRAWINGS

This method and system is illustrated in the accompanying drawings, throughout which like reference letters indicate corresponding parts in the various figures. The embodiments herein will be better understood from the following description with reference to the drawings, in which:

FIG. 1a is an overview of a system for providing dynamic information to an edge enabler client running in a UE, according to an embodiment as disclosed herein;

FIG. 1b shows various hardware components of an edge enabler server, according to embodiment as disclosed herein;

FIG. 2 is a flow chart illustrating a method for providing dynamic information to the edge enabler client running in the UE, according to an embodiment as disclosed herein;

FIG. 3 is a sequential diagram illustrating steps in determining edge data network availability based on a communication between edge application server and an application client, according to the embodiments as disclosed herein;

FIG. 4 is a sequential diagram illustrating steps in determining edge data network availability based on a communication between an edge enabler server and an edge enabler client, according to the embodiments as disclosed herein;

FIG. 5 is a sequential diagram illustrating steps in determining edge data network availability based on a communication between a network function and the UE, according to the embodiments as disclosed herein; and FIG. 6a-FIG. 6c are sequential diagrams illustrating steps in providing dynamic information notification for edge application server availability, according to the embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provides a method for providing dynamic information to an edge enabler client running in a UE. The method includes receiving, by an edge enabler server, a subscription request for a dynamic information subscription from the edge enabler client running in the UE. The subscription request comprises a criteria for the dynamic information subscription. Further, the method includes authorizing, by an edge enabler server, the subscription request received from the edge enabler client. Further, the method includes creating, by the edge enabler server, the dynamic information subscription to provide the dynamic information to the edge enabler client in response to authorizing the subscription request. Further, the method includes sending, by the edge enabler server, a subscription response to the edge enabler client in response to creating the dynamic information subscription.

Unlike conventional methods, in the proposed methods, the application client on the UE to be aware of the latest information about the available edge computing services using an edge enabler layer. The mechanisms of notifications for sharing dynamic availability information, can be used for targeted advertising such as invitations to use edge computing enabled features of the applications.

In the proposed methods, the edge-aware applications on the UE use the edge enabler client for creating these subscriptions? rather than creating the subscriptions themselves. This helps the UE to save resources as only the edge enabler client is interacting with the edge enabler server rather than all the applications interacting as individual entities.

The edge enabler client (140) on the UE provides supporting functions needed for application clients on the UE, edge-aware or otherwise. It helps retrieve information, such as configuration data, from the edge enabler server (300) in order to help establish communication between the application clients on the UE to the edge application servers (150) in the edge.

The various embodiments of the proposed method are adopted in the 3GPP TS 23.558 and 3GPP TR 23.758

Referring now to the drawings, and more particularly to FIGS. 1a through 6c, where similar reference characters denote corresponding features consistently throughout the figures, there are shown preferred embodiments.

FIG. 1a is an overview of a system (1000) for providing dynamic information to an edge enabler client (140) running in a UE (100), according to an embodiment as disclosed herein. In an embodiment, the system (1000) includes the UE (100) and an edge data network (200). In an embodiment, the edge data network (200) includes an edge enabler server (300) and an edge application server (400). The edge application server (400) is aware of the edge data network (200) and can leverage the edge computing capabilities.

The UE (100) can be, for example but not limited to a cellular phone, a tablet, a virtual reality device, a smart phone, a laptop, a Personal Digital Assistant (PDA), a global positioning system, a multimedia device, a video device, an internet of things (IoT) device, a smart watch, a game console, a smart watch, a foldable display device, an Unmanned Aerial Vehicle (UAV), an airplane or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like.

The edge enabler server (300) receive a subscription request for a dynamic information subscription from the edge enabler client (140). The subscription request includes information is related to at least one of a level of the dynamic information to be received by the at least one edge-aware application (150) during the dynamic information subscription, a trigger condition to provide at least one notification of the dynamic information to the at least one edge-aware application (150) during the dynamic information subscription, and a criteria to filter the dynamic information to be received by the at least one edge-aware application (150) during the dynamic information subscription.

In an embodiment, a level of the dynamic information tells the details of dynamic information related to the applications running on the edge application server, or the edge hosting environment which may change over time. In an example, the IP address of the edge application server, the edge application servers available on the edge etc.

In an embodiment, the trigger conditions instruct the edge enabler server (400) to initiate a notification to the edge enabler client (140) as and when the conditions mentioned in the trigger meet at the edge enabler server (400). These conditions, as per the proposed methods, can be set by the edge enabler client (140), in response to a request from the edge-aware application (150). For e.g. availability of a new edge application server (400), crash of an edge application server (400), change in UE's location, change in edge conditions such as available compute, storage etc.

In an embodiment, the filter information primarily includes the information to be used by the edge enabler server (400) to filter out unnecessary notification to the edge enabler client (140). Such filters include for e.g., the application IDs or application types about which the edge enabler server (400) should be notified.

In other words, the level of the dynamic information basically indicates the details the which should be notified (for e.g. change in IP address, available resources, new applications that are available), the trigger condition indicates when such notification should be sent and the filter criteria indicates for which applications or application types or the edge such dynamic information should be shared.

In an embodiment, the subscription request from the edge enabler client (140) to the edge enabler server (300) is triggered in response to a request received by the edge enabler client (140) from at least one edge-aware application (150).

Further, the edge enabler server (300) authorizes the dynamic information subscription request received from the edge enabler client (140).

Based on the authorization, the edge enabler server (300) creates the dynamic information subscription to provide the dynamic information to the edge enabler client (140). In response to creating the dynamic information subscription, the edge enabler server (300) send a subscription response to the edge enabler client (140) running to the UE (100).

In an embodiment, the dynamic information subscription is created by detecting that the at least one edge-aware application (150) running in the UE (100) is authorized to subscribe for the dynamic information subscription. In an example, the authorization is performed based on credentials included in the subscription request.

The dynamic information subscription request received from the edge enabler client is authorized by determining that the edge enabler client (140) is authorized to subscribe for at least one of a level of the dynamic information, a trigger condition and a criteria to filter the dynamic information.

Further, the edge enabler server (300) detects the change in level of dynamic information matching to a criteria to filter the dynamic information and determines that a trigger condition is met in response to detecting the change in the dynamic information. In response to determination, the edge enabler server (300) sends a notification of the dynamic information comprising the acquired information to the UE (100) based on the dynamic information subscription.

In an embodiment, the information update comprises at least one of a change in location of the UE (100) and a change in condition of the edge enabler server (300).

In an embodiment, the UE (100) includes a processor (110), a communicator (120), a memory (130), an edge enabler client (140), at least one edge-aware application (150a-150n), and a NAS entity (160). Hereafter, the label of the edge-aware application is 150. In the patent application, the terms the edge-aware application (150) and an application client are used interchangeably. The edge-aware application (150) is aware of edge data network and can leverage the edge computing capabilities. The edge-aware application (150) can be, for example, but not limited to a game application, a virtual reality application, a finance application, a video application, a multimedia application, a sports application or the like.

The processor (110) is coupled with the memory (130), the communicator (120), the edge enabler client (140), the edge-aware application (150), and the NAS entity (160). The processor (110) is configured to execute instructions stored in the memory (130) and to perform various processes. The communicator (120) is configured for communicating internally between internal hardware components and with external devices via one or more networks.

Further, the processor (100) receives the notification of the dynamic information comprising the acquired information from the edge enabler server (300) and performs at least one action based on the received notification. The at least one action comprises rerouting a traffic corresponding to the at least one edge-aware application (150), changing a quality of service (QoS) requirement corresponding to the at least one edge-aware application (150), altering a feature set corresponding to the at least one edge-aware application (150), and changing an interface of the at least one edge-aware application (150).

The memory (130) stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Although the FIG. 1a shows various hardware components of the system (1000) but it is to be understood that other embodiments are not limited thereon. In other embodiments, the system (1000) may include less or more number of components. Further, the labels or names of the components are used only for illustrative purpose and does not limit the scope of the invention. One or more components can be combined together to perform same or substantially similar function to handle the dynamic information subscription.

FIG. 1b shows various hardware components of the edge enabler server (300), according to embodiment as disclosed herein. In an embodiment, the edge enabler server (300) includes a processor (310), a communicator (320), and a memory (330). The processor (310) is coupled with the memory (330) and the communicator (320). The processor (310) includes a dynamic information subscription engine (310a) and a dynamic information subscription creation engine (310b).

In an embodiment, the dynamic information subscription engine (310a) receives a subscription request for the dynamic information subscription from the at least one edge-aware application (150). Based on the dynamic information provided in the subscription request, the dynamic information subscription creation engine (310b) creates the dynamic information subscription to provide the dynamic information to the at least one edge-aware application (150). Further, the dynamic information subscription engine (310a) sends a subscription response to the UE (100) in response to creating the dynamic information subscription. In an embodiment, the dynamic information subscription is created by determining that the at least one edge-aware application (150) running in the UE (100) is authorized to subscribe for the dynamic information subscription.

Further, the dynamic information subscription engine (310a) acquires information update from the edge application server (400) and determines that the acquired information is different from a predefined information. Based on the dynamic information subscription, the dynamic information subscription engine (310a) sends a notification of the dynamic information comprising the acquired information to the UE (100).

The processor (310) is configured to execute instructions stored in the memory (330) and to perform various processes. The communicator (320) is configured for communicating internally between internal hardware components and with external devices via one or more networks.

The memory (330) stores instructions to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In some examples, the memory (330) can be configured to store larger amounts of information than the memory. In certain examples, a non-transitory storage medium may store data that can, over time, change (e.g., in Random Access Memory (RAM) or cache).

Although the FIG. 1b shows various hardware components of the edge enabler server (300) but it is to be understood that other embodiments are not limited thereon. In other embodiments, the edge enabler server (300) may include less or more number of components. Further, the labels or names of the components are used only for illustrative purpose and does not limit the scope of the invention. One or more components can be combined together to perform same or substantially similar function to handle the dynamic information subscription.

FIG. 2 is a flow chart (S200) illustrating a method for providing dynamic information to at least one edge-aware application (150) running in the UE (100), according to an embodiment as disclosed herein. The steps (S202-S206) are performed by the processor (310).

At S202, the method includes receiving the subscription request for the dynamic information subscription from the edge enable client (140). At S204, the method includes creating the dynamic information subscription to provide the dynamic information to the edge enable client (140) based on the dynamic information provided in the subscription request. At S206, the method includes sending a subscription response to edge enable client (140) in response to creating the dynamic information subscription.

The various actions, acts, blocks, steps, or the like in the flow chart (S200) may be performed in the order presented, in a different order or simultaneously. Further, in some embodiments, some of the actions, acts, blocks, steps, or the like may be omitted, added, modified, skipped, or the like without departing from the scope of the invention.

FIG. 3 is a sequential diagram illustrating steps in determining edge data network availability based on a communication between edge application server (400) to the application client (150), according to the embodiments as disclosed herein.

In general, availability of the edge computing systems can change dynamically due to multiple reasons. Such changes should be notified to the applications (150) to fine tune the services. For instance, the availability of the edge applications may be dependent on the location of the user, and the content that is available at the edge. In addition, the availability of such notification may also be used in application or service continuity when the user is in mobility for efficiency reasons. In a particular scenario, when the application client is interacting with the edge application server (400), and upon receiving the notification of availability of the edge data network (200) and the corresponding edge application server (400), the application client may decide to use the edge application server (400) hosted on the edge. Similarly such notifications may assist in continuity between the edge application servers (400) across two edge data networks (200) or two edge platforms with the same edge network.

Further, the mechanisms of notifications for sharing dynamic availability information, can be used for targeted advertising such as invitations to use the edge computing enabled features of the applications.

The proposed method proposes a category of applications called the edge aware applications. The edge aware applications know about the availability of the edge computing systems and leverage the capabilities provided by the edge computing systems to provide better user experience and possibly new features, which otherwise are not feasible. These applications on being informed of the edge computing systems, may adapt the user interface to enable new features, adjust latency requirements, offload computing to the Edge computing system etc.

In order to enable such a functionality the edge computing system need to inform the application about the availability of the system for e.g. when the UE (100) moves from an area where the system is available to an area where it is not, and vice-versa. The proposed method can be used to inform the UE (100), and the application (150) thereof, about the availability of the edge computing system.

As illustrated in the FIG. 3, the edge application server (400), if aware of the edge data network's (un)availability at the UE's location, can notify its Application Client accordingly.

Preconditions: The edge application server (400) is aware of the UE's location, either through the network or location reporting from the UE (100). The edge application server (400) is aware of the Edge Data Network's (un)availability status, or any changes to its availability at the UE's current location. This may require interaction with the network (200) to determine the edge network topology.

At 302: The certain trigger condition(s), such as change in UE's location information, change in the edge data network (un)availability information at UE's current location etc. meet at the edge application server (400).

At 304: as a result of 302, the edge application server (400) triggers the notification to the application client containing the latest edge data network's (un)availability status.

At 306: Upon receiving the notification, the application client may connect to new edge data network and adjust its behavior, for e.g. changes the QoS requirements, alters the feature set, changes the interfaces etc. accordingly. The application client may also update the user about the (un)availability of the edge data network (200).

In an alternate embodiment, the edge application server (400) may notify the edge enabler client about the (un)availability status of the edge data network. This approach will require an interface or API through which the enabler client (140) may notify the application client.

FIG. 4 is a sequential diagram illustrating steps in determining edge data network availability based on the communication between the edge enabler server (300) to the edge enabler client (140), according to the embodiments as disclosed herein. As illustrated in the FIG. 4, the edge enabler server (300) can push a notification to the edge enabler client (140) of the UE (100) to update about the Edge Data Network's availability at the UE's current location.

Preconditions: The edge enabler client (140) has provisions to receive notifications from the edge enabler server (300). In an alternate embodiment, the edge enabler client (140) (or the UE (100)) may have explicitly registered for the push notifications on a push notification service such as firebase cloud messaging or Apple push notification service etc. The edge enabler server (300) has information about the UE's current location.

At 402, the edge enabler server (300) meets the certain trigger condition(s), such as change in UE's location information, change in edge data network (un)availability at UE's current location etc., at the edge enabler server (300).

At 404, in response to step 402, the edge enabler server (300) triggers the notification to the edge enabler client (140) containing the latest edge data network's (un)availability status.

At 406, upon receiving the notification, the edge enabler client (140) processes the notification and may adjust the UE's behavior, such as rerouting the application traffic destined for edge application server deployed in a cloud network to the edge application servers (400) deployed in the Edge data network (200) and vice versa if the edge data network (200) is not available anymore. The edge enabler client (140) may notify the user about the (un)availability of the edge data network (200). The edge enabler client (140) may further notify the application client(s) on the UE (100).

At 408, upon receiving the notification from the edge enabler client (140), the application client may adjust its behavior, for e.g. changes the QoS requirements, alters the feature set, changes the interfaces etc. accordingly. The application client may also update the user about the (un) availability of the edge data network (200).

In another embodiment, the application client(s) has registered to receive the edge data network availability information at the edge enabler client (140), over an interface between the edge application server (400) and the edge enabler client (140) or using APIs. In an alternate embodiment of the FIG. 4, the edge enabler server (300) may notify the application client(s) about the (un)availability status of the edge data network (200).

FIG. 5 is a sequential diagram illustrating steps in determining edge data network availability based on the communication between the 3GPP network (500) to the UE (100), according to the embodiments as disclosed herein. As illustrated in the FIG. 5, updates from the 3GPP Network (500) to the NAS entity (160) in the UE (100) can be provided to update the UE (100), and the application or the edge enabler client thereof, about the (un)availability of the edge data network. The operations of the 502-506 are similar to operations of the 302-306. Following are the alternatives:

1) When the UE (100) moves to new Tracking Area Identity (TAI), the NAS entity (160) in a NAS message for example registration accept or UE configuration update etc. can indicate to the UE (100) whether the edge services are supported or not supported in a registration area.

2) When the UE (100) in a given registration area changes the status of edge services (i.e. whether edge enabler server (300) is available) this information can be indicated to the UE (100) as part of NAS message for example UE configuration update or downlink (DL) NAS transport or UE policy delivery.

3) When the UE (100) initiates a Protocol Data Unit (PDU) session connectivity request. A core network can indicate whether edge services are possible or not possible (i.e. whether edge enabler server is available) to the UE (100) during a PDU session establishment procedure for that particular PDU session.

In an embodiment, the above indication of edge enabler server availability is provided only if the UE (100) is subscribed for edge services. The information can also indicate to the UE (100) which edge enablers are available in the area.

FIG. 6a-FIG. 6c is a sequential diagram illustrating steps in providing dynamic information notification for the edge application server availability, according to the embodiments as disclosed herein. The information about the edge application server(s) (400) and the edge data network (200) which may change sporadically, such as the information about the geographical regions where the edge application server(s) (400) are available, days of the week or time periods of the day when the edge application server(s) (400) are available or the running status of the edge application server(s) (400), and the likes of such information, collectively is referred to as dynamic information in the patent application. The granularity of such availability information for the Edge aware applications (150) can be fine-tuned. One such scenario would be to make the UE (100), and the Application Client(s) thereof, aware of specific applications available on the edge computing system, in addition to the availability of the edge data network itself. Further there may be dynamic changes to the application's availability which may also be updated. The proposed method can be used to provide a novel mechanism for the UE (100) with the edge enabler client (140) to subscribe for such an availability information from the edge enabling server (300) as described in the FIG. 6a and FIG. 6b.

As illustrated in the FIG. 6a and FIG. 6b, the edge enabler client (140) subscribes to the edge enabler server (300) for dynamic information. These subscriptions can be very specific to the edge application server (400) or can be generic to include all the edge application servers (400) running on the edge data network (200). In certain implementations of the edge enabler clients (140), the edge enabler client can be configured to automatically subscribe for such dynamic information from the edge enabler server (300).

Preconditions: The edge enabler client is authorized to subscribe for the dynamic information. The edge enabler client is registered to the edge data network.

At 602a, the edge enabler client (140) sends the dynamic information subscription request to the edge enabler server (300). Table 1 indicates an information element along with the description in the subscription request.

TABLE 1

| Information element | Status | Description |
| --- | --- | --- |
| EEC ID | M | Unique identifier of the Edge Enabler Client. |
| UE Identifier | O | The identifier of the UE (i.e. GPSI or identity token) |
| Security credentials | O | Security credentials resulting from a successful authorization for the edge computing service. |
| Subscription Filters | O | List of characteristics for subscription. |
| Notification triggers | O | Notification triggers such as information update from EAS, availability of a better EAS etc. |

The request can indicate the level of dynamic information that is required by the edge enabler client (140), such as per the edge application server (400) or for all edge application server(s) (400) running on the edge data network (200). In an embodiment, the edge enabler client (140) may indicate the trigger conditions for the notifications along with the subscription request. Further, the request may also contain additional criteria that may be used to filter the response(s) to the subscription request. For example, the edge enabler client (140) may only be interested in the gaming services that are available on the edge data network (200). Table 2 indicates an information element along with the description the subscription filters.

TABLE 2

| Information element | Status | Description |
| --- | --- | --- |
| EAS IDs | O | List of EAS IDs EEC is interested in. |
| EAS type | O | The category or type of EAS (e.g. V2X) |
| EAS Provider Identifier | O | Provider of the EAS |
| Desired feature(s) | O | Desired service features e.g. single vs. multi-player gaming service |
| Location availability | O | The desired location(s) (e.g. geographical area, route) where the service should be available. |
| Application Client Profile(s) | O | Profiles of Application Clients with parameters used to determine matching EAS. |

In an embodiment, a level of the dynamic information is the dynamic information related to the applications running on the edge application server, or the edge hosting environment which may change over time. In an example, the IP address of the edge application server, the edge application servers available on the edge etc.

In an embodiment, the trigger conditions instruct the edge enabler server (400) to initiate a notification to the edge enabler client (140) as and when the conditions mentioned in the trigger meet at the edge enabler server (400). These conditions, as per the proposed methods, can be set by the edge enabler client (140), in response to a request from the edge-aware application (150). For e.g. availability of a new edge application server (400), crash of an edge application server (400), change in UE's location, change in edge conditions such as available compute, storage etc.

In an embodiment, the filter information primarily includes the information to be used by the edge enabler server (400) to filter out unnecessary notification to the edge enabler client (140). Such filters include for e.g., the application IDs or application types about which the edge enabler server (400) should be notified.

At 604a, the edge enabler server (300) checks the authorization of the edge enabler client (140) to subscribe to such dynamic information, and applies the filters, if any.

At 606a, in response to the authorization, the edge enabler server (300) creates the subscription and sends a subscription response to the edge enabler client (140). Table 3 indicates an information element along with the description the subscription response.

TABLE 3

| Information element | Status | Description |
| --- | --- | --- |
| Result | M | Success or failure to create the subscription |
| Cause | O | Failure reason. |

At 608a, the edge application server(s) (300) can provide information to the edge enabler servers (300) that has significance for the UEs (100) for e.g. any change in criteria, such as time or location, for which the availability information is informed to the edge enabler client (140).

At 610a, the edge application server(s) (300) checks the trigger condition(s), such as information update from the edge application server illustrated in Step 608a meet at the edge enabler server (300).

At 612a, in response to checking 610a, the edge enabler server (300) triggers a notification to the edge enabler client (140) containing the latest dynamic information update. Table 4 indicates an information element along with the description the notification.

At 614a, upon receiving the notification described in step 612a, the edge enabler client (140) processes the notification and may adjust the UE's behavior, such as rerouting the application traffic destined for the application server deployed in the cloud network to the edge application servers (400) deployed in the edge data network (200) and vice versa. The edge enabler client (140) may notify the user about the changes. The edge enabler client (140) may further notify the application client(s) on the UE (100) about the changes in availability of the edge application server(s) (400).

TABLE 4

| Information element | Status | Description |
| --- | --- | --- |
| Updated EAS information | M | List of updated EAS information. Each element includes the information described below. |

TABLE 4-continued

| Information element | Status | Description |
| --- | --- | --- |
| EAS Endpoint | M | Endpoint information for establishing a connection to the EAS (e.g. FQDN, IP address) |
| EAS ID | O | Identifier of the EAS |
| EAS name | O | Name of the EAS |
| EAS description | O | Human-readable description of the EAS |
| Supported features | O | Supported service features e.g. single vs. multi-player gaming service |
| Service permission levels | O | Supported level of service permissions e.g. trial, gold-class |
| Location availability | O | The desired location(s) (e.g. geographical area, route) where the service is be available. |
| Time of operation | O | The operation time during which the EAS is available |
| EAS Available Compute | O | The maximum compute resource available for the Application Client |
| EAS Available Graphical Compute | O | The maximum graphical compute resource available for the Application Client |
| EAS Available Memory | O | The maximum memory resource available for the Application Client |
| EAS Available Storage | O | The maximum storage resource available for the Application Client |

At 616a, upon receiving the notification from the edge enabler client (140), the application client(s) may adjust its behavior, for e.g. changes the QoS requirements, alters the feature set, changes the interfaces etc. accordingly. The application client may also update the user about the changes.

In an embodiment, the application client(s) has registered for edge application server information at the edge enabler client (140), over an interface between the edge application server (400) and the edge enabler client (140).

In an embodiment, the edge enabler client (140) updates the subscription with the edge enabler server (300) to add or remove the application client(s) from the dynamic information subscription. This update can be result of a new application client installation or removal of an application client from the UE (100). Alternatively, this update can be a result of an explicit request from the edge application server (400).

Certain useful notifications are listed below, which can be triggered by either the edge enabler server (300) or the edge application server (400) or the 3GPP Network (500):
1) Edge data network availability/unavailability,
2) Edge application server's availability/unavailability on the edge data network (200), and
3) Application's availability in the cloud network, The above list is just a set of examples and in no way is an exhaustive list of possible notifications. These notifications are triggered based on certain conditions meeting the criteria at the triggering entity (i.e., edge enabler server (300), edge application server (400) or the 3GPP network (500)). Certain possible trigger conditions are listed below:
1) Updates from the edge application server (400),
2) Entry/Exit from a geographic location,
3) Time of day,
4) New deployments of edge application servers (400),
5) Periodic timers.

The notifications can be result of one trigger condition or a combination of trigger conditions meeting the criteria. The above list is just an example and in no way is an exhaustive list of trigger conditions.

The embodiments in this invention consider notifications to the edge-aware applications (150) on the UE (100), but in an alternate embodiment, similar methods may be used for edge-unaware application based on decisions made by the edge enabler client (140).

Targeted advertising: The dynamic notifications can be used by the edge service provider to publish targeted advertisements related to the edge data network (200), the applications running on the edge data network (200) and their features. For e.g. for an application providing an augmented reality (AR) information to the spectators in a stadium leveraging the capabilities of the edge computing system, can push targeted advertisements to the attendance in the stadium to use their application and enhance the game viewing experience.

Edge application server (Edge Application) store: Further to the advertisements, the information that the edge enabler client (140) receives about the availability of the Edge Data Network and Edge application server(s) running on the Edge Data Network can be used by the UE to furnish an application store for the users. The application store, dubbed as Edge application server (Edge Application) store in this invention, can be provided as a platform for the users to discover, download and install new applications that are provided by the Edge service provider.

Further, the operations of the FIG. 6b and FIG. 6c is part of the operation of the FIG. 6a. For the sake of brevity, we are not explained again.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

INDUSTRIAL APPLICABILITY

The present disclosure can be applied to edge computing systems.

The invention claimed is:

1. A method for an edge enabler client (EEC) to subscribe by an edge enabler server (EES), the method comprising:
receiving, from the EEC, a subscription request including an edge enabler client ID (EEC ID), security credentials, and a first filter for an edge application server(s) (EAS(s));
checking whether the EEC is authorized to subscribe for dynamic information of the EAS(s) upon receiving the subscription request;
creating a subscription for the dynamic information of the EAS if the subscription request is authorized; and
sending a subscription response to the EEC.

2. The method of claim 1, wherein the first filter includes a list of EAS(s) dynamic information requested by the EEC and a geographical service area for an edge application server (EAS) service.

3. The method of claim 1, further comprising:
identifying whether a trigger condition is satisfied, if information of the EAS is changed; and
sending, to the EEC, notification including the changed information of the EAS, if the trigger condition is satisfied,
wherein the trigger condition is provided from the EEC.

4. The method of claim 3, wherein
the notification includes time information which the EAS(s) is available.

5. The method of claim 1, further comprises:
storing a dynamic information subscription.

6. The method of claim 1,
wherein the subscription request further includes a user equipment identifier (UE ID) including the EEC.

7. The method of claim 1,
wherein the subscription response indicates success or failure and contains a failure reason if the subscription response indicates failure.

8. The method of claim 1, wherein the EEC is running in a user equipment (UE).

9. An edge enabler server (EES) for subscribing to an edge enabler client (EEC), the EES comprising:
a memory; and
a processor, coupled with the memory, configured to control to:
receive, from the EEC, a subscription request including an edge enabler client ID (EEC ID), security credentials, and a first filter for an edge application server(s) (EAS(s)),
check whether the EEC is authorized to subscribe for dynamic information of the EAS(s) upon receiving the subscription request,
create a subscription for the dynamic information of the EAS if the subscription request in authorized, and
send a subscription response to the EEC.

10. The EES of claim 9, wherein the first filter includes a list of EAS(s) dynamic information requested by the EEC and geographical service area for an edge application server (EAS) service.

11. The EES of claim 9, wherein the processor is further configured to control to:
identify whether a trigger condition is satisfied, if information of the EAS is changed, and
send, to the EEC, a notification including the changed information of the EAS, if the trigger condition is satisfied,
wherein the trigger condition is provided by the EEC.

12. The EES of claim 11, wherein
the notification includes time information which the EAS(s) is available.

13. The EEC of claim 9, wherein the processor is further configured to
control to store a dynamic information subscription.

14. The EES of claim 9, wherein the subscription request further includes a user equipment identifier (UE ID) including the EEC.

15. The EES of claim 9, wherein the subscription response indicates success or failure and contains a failure reason if the subscription response indicates failure.

16. The EES of claim 9, wherein the EEC is running in a user equipment (UE).

* * * * *